Dec. 29, 1964     E. H. KONRAD ETAL     3,163,500

SANDWICH COMPOSITE BRAZING ALLOY

Filed Aug. 3, 1962

INVENTORS
Erich Konrad
Charles A. Currie
BY

ATTORNEY

3,163,500
SANDWICH COMPOSITE BRAZING ALLOY
Erich H. Konrad, Montclair, and Charles A. Currie, Madison, N.J., assignors to Engelhard Industries, Inc., Newark, N.J., a corporation of Delaware
Filed Aug. 3, 1962, Ser. No. 214,705
9 Claims. (Cl. 29—194)

This invention relates to brazing alloys and more particularly to a novel method for the production of brazing alloys and the brazing alloys per se.

It is known in the art to produce brazing alloy by sintering a mass of powdered or granular high temperature-melting metal, for instance nickel, to form a porous coherent skeletal structure, followed by infusing this porous structure with molten brazing metal to fill the pores thereof. While this preparative method is suitable for producing certain brazing alloys, it can only be employed for producing brazing alloys containing relatively large amounts of high temperature-melting metal because of the difficulty or impossibility of introducing more than 25–50% of brazing alloy into the porous structure. The method of the present invention permits the use of such an infused porous structure in the manufacture of a brazing alloy containing a much lower content of the high temperature-melting metal, for instance containing 20–50% of the high temperature-melting metal.

In accordance with the present invention, a new and valuable method is provided for producing brazing alloys which enables the introduction of relatively large quantities of brazing metal therein and which is especially well suited for use in the brazing of structural elements or parts which are for the most part inaccessible, for instance the honeycomb panels of stainless steel used in aircraft. The method involves the formation first of an integral structure comprising particles of a high temperature-melting metal and a brazing metal filling the spaces between the particles. The brazing metal is characterized by having a materially lower melting temperature than the first-mentioned metal, and the first-mentioned metal is substantially insoluble in the brazing metal at the melting temperature of the brazing metal. This integral structure is preferably formed by commingling or blending the powdered high temperature melting metal and powdered brazing metal, and heating the resulting mixture to a temperature above the melting point of the brazing metal but below the melting point of the first-mentioned metal to obtain an integral structure comprising a continuous matrix of brazing metal having dispersed therein the high temperature melting metal particles. The integral structure is reduced in thickness by mechanical working, preferably rolling. Additional of the brazing metal is then secured to the structure of reduced thickness to form a sandwich composite, and this composite is then mechanically worked, for instance by rolling, to the desired shape. Preferred form of the alloy from the mechanical working is as strip.

The integral structure to which additional of the brazing metal is secured can also be formed by the prior art sintering and infusion method previously referred to herein.

Exemplary of the high temperature melting metal are the iron group metals of group VIII of the Periodic Table, i.e. nickel, iron and cobalt, and their base metal alloys, for instance nickel-iron and nickel-chromium-iron alloys.

Brazing metals suitable for use herein include silver, copper and their alloys, specific examples of the alloys being disclosed hereinafter.

When the high temperature-melting metal is nickel, the following are typical alloy compositions that may be utilized with the nickel in preparing the brazing alloy of this invention.

*Alloy Composition I*

| Ingredient: | Percent by weight |
|---|---|
| Ag | 84.6 |
| Pd | 2.2 |
| Cu | 7.5 |
| In | 5.5 |
| Li | .2 |

*Alloy Composition II*

| Ingredient: | |
|---|---|
| Ag | 92.5 |
| Pd | 7.5 |

*Alloy Composition III*

| Ingredient: | |
|---|---|
| Ag | 95 |
| Cu | 4.8 |
| Li | .2 |

*Alloy Composition IV*

| Ingredient: | |
|---|---|
| Ag | 95 |
| Pd | 5 |

When the high temperature-melting metal is cobalt, the following are typical alloy compositions that may be used with the cobalt in preparing the brazing alloy of this invention.

*Alloy Composition V*

| Ingredient: | Percent by weight |
|---|---|
| Ag | 72 |
| Cu | 27.8 |
| Li | .2 |

*Alloy Composition VI*

| Ingredient: | |
|---|---|
| Ag | 45 |
| Cu | 15 |
| Zn | 16 |
| Cd | 24 |

*Alloy Composition VII*

| Ingredient: | |
|---|---|
| Ag | 40 |
| Cu | 30 |
| Zn | 25 |
| Ni | 5 |

*Alloy Composition VIII*

| Ingredient: | |
|---|---|
| Ag | 95 |
| Pd | 5 |

*Alloy Composition IX*

| Ingredient: | |
|---|---|
| Ag | 65 |
| Pd | 15 |
| Cu | 20 |

*Alloy Composition X*

| Ingredient: | |
|---|---|
| Ag | 92.5 |
| Cu | 7.5 |

*Alloy Composition XI*

| Ingredient: | |
|---|---|
| Ag | 77 |
| Cu | 21 |
| Ni | 2 |

Alloy Composition XII

| Ingredient: | Percent by weight |
|---|---|
| Ag | 75 |
| Cu | 24.5 |
| Ni | .5 |

Alloy Composition XIII

| Ingredient: | |
|---|---|
| Ag | 84.6 |
| Cu | 7.5 |
| Pd | 2.2 |
| In | 5.5 |
| Li | 0.2 |

When iron is the high temperature melting metal, silver or copper per se may be utilized and the silver or copper can be substantially pure. The following alloy compositions are typical ones that can also be used with the iron in preparing the brazing alloy of this invention.

Alloy Composition XIV

| Ingredient: | Percent by weight |
|---|---|
| Ag | 72 |
| Cu | 27.8 |
| Li | .2 |

Alloy Composition XV

| Ingredient: | |
|---|---|
| Ag | 45 |
| Cu | 15 |
| Zn | 16 |
| Cd | 24 |

Alloy Composition XVI

| Ingredient: | |
|---|---|
| Ag | 54 |
| Cu | 40 |
| Zn | 5 |
| Ni | 1 |

Alloy Composition XVII

| Ingredient: | |
|---|---|
| Ag | 40 |
| Cu | 60 |

Alloy Composition XVIII

| Ingredient: | |
|---|---|
| Ag | 53 |
| Cu | 47 |

Alloy Composition XIX

| Ingredient: | |
|---|---|
| Ag | 95 |
| Pd | 5 |

Alloy Composition XX

| Ingredient: | |
|---|---|
| Ag | 58 |
| Pd | 10 |
| Cu | 32 |

Alloy Composition XXI

| Ingredient: | |
|---|---|
| Ag | 62.5 |
| Cu | 32.5 |
| Ni | 5 |

Alloy Composition XXII

| Ingredient: | |
|---|---|
| Ag | 77 |
| Cu | 21 |
| Ni | 2 |

Alloy Composition XXIII

| Ingredient: | |
|---|---|
| Ag | 92.5 |
| Cu | 7.5 |

Alloy Composition XXIV

| Ingredient: | Percent by weight |
|---|---|
| Ag | 84.6 |
| Cu | 7.5 |
| Pd | 2.2 |
| In | 5.5 |
| Li | .2 |

The high temperature melting metal can be powdered metal available in commerce and may vary from virtually pure metal to metal containing minor amounts of impurities and alloying constituents which neither increase its solubility in the brazing metal nor reduce the ductility. The iron powder can be produced by the gaseous reduction of iron oxide or by the electrolytic process, the nickel can be prepared by hydrogen reduction or by the electrolytic process, and the cobalt can be prepared by hydrogen reduction.

Reference is now made to the accompanying drawings where:

Figure 1:
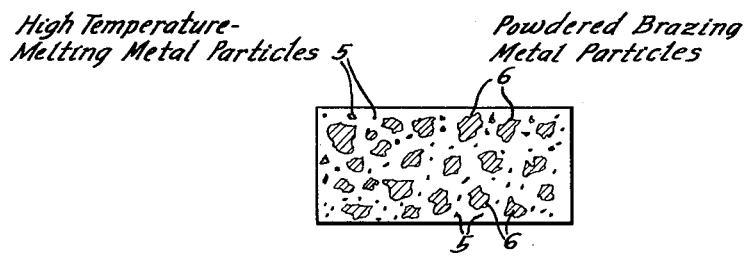
FIGURE 1 is a schematic illustration showing enlarged a blend or mixture of the powdered high temperature-melting particles and the powdered brazing metal particles of this invention.

In a preferred embodiment, in preparing the blend of powdered high temperature-melting metal particles and powdered brazing metal particles of FIGURE 1, the powdered high temperature-melting metal particles 5, for instance powdered nickel, and the powdered brazing metal particles 6, for instance of the silver alloy of Alloy Composition I previously set forth, are blended or commingled together in a suitable container to form a mixture of the particles with voids between the particles. The high temperature-melting metal particles have typical particle size of 44 microns, and the brazing metal particles have typical particle size of 150 microns. The high temperature-melting metal is characterized by being substantially insoluble in the brazing metal at the melting temperature of the brazing metal.

The blend is then heated in a mold preferably in the presence of a reducing gas, for instance $H_2$, to a temperature above the melting point of the brazing metal but preferably not higher than 25° F. above the liquidus, i.e. flow point of the brazing metal, which is below the melting point of the high temperature-melting metal. Temperatures not higher than 25° F. above the liquidus of the brazing metal are preferred in this heating or liquid phase sintering because at temperatures much in excess of 25° F. above the brazing metal liquidus, there is too much "run out" of brazing metal from the region or vicinity of the high temperature-melting metal solid particles due to the molten brazing metal becoming too liquid due to its lower viscosity. Pressure is not employed in this heating operation because the desired structure is not obtained at this stage of the process with pressure application. The product of this heating which is subsequently allowed to cool, is shown in FIGURE 2 and is an integral structure comprising a continuous matrix 7 of the brazing metal throughout which is distributed the particles 8 of the high temperature-melting metal.

Figure 2:
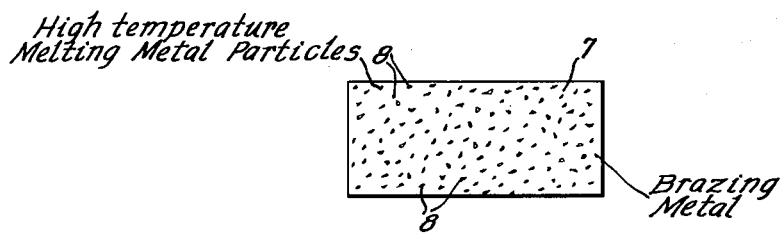
FIGURE 2 is a schematic illustration showing enlarged the high temperature-melting particles distributed throughout the continuous matrix of brazing metal.

This product of FIGURE 2 is then rolled down by conventional method to plate form and preferably to such an extent as to effect a reduction of at least 50 percent in its cross-sectional area. The plate from the rolling down of the FIGURE 2 product is an important aspect of the invention for the reason that by effecting the reduction of 50 percent or higher in the cross-sectional area of the alloy, a product is obtained which is of 100 percent density, i.e. free or virtually free of porosity. And this is important in connection with subsequent steps of the method of securing additional of the brazing metal to faces of the rolled alloy and then subjecting the alloy to a final rolling inasmuch as if the intermediate integral alloy structure is not free or virtually free of porosity, there is a tendency in the final rolling step to get separation of the additional brazing metal from the intermediate alloy and cracking of the final product through the intermediate or central alloy structure. This rolling of the alloy after the heating treatment or liquid phase sintering is also important in that flat smooth surfaces or faces are obtained on opposite faces of the alloy which readily lends itself to bonding of additional of the brazing metal to each face. After the heating treatment or liquid phase sintering, uneven rough surfaces are present which are not especially good for the bonding of additional brazing metal thereto.

Additional of the brazing metal is then bonded or secured, for instance by cladding, to opposite faces of the alloy from the rolling to form a sandwich composite. When nickel is the high temperature-melting metal, the brazing metal is bonded to both faces of the rolled alloy in amount sufficient to reduce the nickel content in the resulting composite to preferably about 15 percent–25 percent by volume, more preferably about 20 percent by volume. When iron or cobalt or other high melting metal is utilized in place of the nickel, the additional brazing alloy is bonded to the rolled alloy in amount sufficient to reduce the content of the high temperature-melting metal to the particular percentage or content desired.

The composite is then rolled or otherwise mechanically worked to strip form. The rolling effects a flattening of the nickel or other higher temperature-melting particles dispersed throughout the matrix of brazing metal, which particles were previously flattened to some extent by the first-mentioned rolling.

Figure 3:
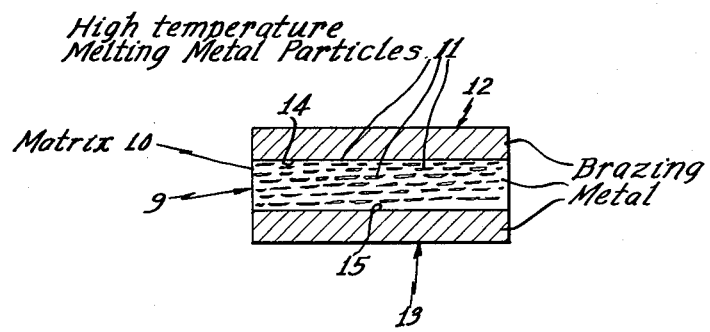
FIGURE 3 is a schematic illustration of a transverse view of the product brazing alloy sandwich composite in strip form after rolling.

The preferred product brazing alloy from the rolling, shown in FIGURE 3, is a sandwich composite having an intermediate portion 9 including continuous matrix 10 of the brazing metal, for instance the silver brazing alloy of Alloy Composition I previously disclosed herein, having distributed therethrough a plurality of thin plates or laminar particles 11 of greater length than thickness of the nickel or other high temperature-melting metal, with two outer portions 12 and 13 of the brazing metal secured to each smooth flat face 14 and 15 respectively of the intermediate portion 9 to form an integral composite. In this preferred embodiment, the thin plates 11 of the nickel or other high temperature-melting metal previously disclosed are not connected and do not cohere to one another. However, these plates could be connected and cohere to one another. The product sandwich composite of FIGURE 3 is in strip form and has typical dimensions of width of 10″ and thickness of .002″. If desired, the product sandwich composite from the rolling or other mechanical working can be in the form of sheets instead of strip.

The brazing alloy of this invention is well suited for use in fabricating an all metal stainless steel honeycomb panel or assembly for aircraft. The honeycomb assembly consists of two "cover" sheets spaced on either side of a pre-assembled cellular honeycomb core. The walls of the cellular core are usually in a plane normal to one or both end sheets.

In the fabricating of the honeycomb assembly, the sandwich brazing alloy sheets of this invention are placed between the outside cover sheet and the honeycomb core. Pressure is applied to the cover sheets and the assembly is heated under a dry, inert atmosphere to the temperature required to melt the low melting brazing metal constituent of the composite brazing sheet. This low melting constituent flows to form fillets at the cellular core and cover sheet junction which upon cooling, bonds the assembly into a unit.

The laminar particles of Ni or other high temperature-melting metal serve to prevent draining of the molten brazing metal from the upper face of the joint and also retain the brazing metal in place on round or curved or wedge-shaped panels.

It will be obvious to those skilled in the art that many modifications may be made within the scope of the present invention without departing from the spirit thereof and this invention includes all such modifications.

What is claimed is:

1. A sandwich composite brazing alloy comprising an intermediate portion including a plurality of laminar particles oriented in generally parallel planes of a high temperature-melting metal of the group consisting of nickel, iron and cobalt and their base metal alloys, and a brazing metal filling the spaces between the particles, the high temperature-melting metal being substantially insoluble in the brazing metal at the melting temperature of the brazing metal, an outer portion of brazing metal secured to a face of the intermediate portion, and another portion of brazing metal secured to an opposite face of the intermediate portion, the brazing metal melting at a substantially lower temperature than the high temperature-melting metal.

2. A sandwich composite brazing alloy comprising an intermediate portion including a continuous matrix of brazing metal having distributed therethrough a plurality of laminar particles oriented in generally parallel planes of a high temperature-melting metal of the group consisting of nickel, iron and cobalt and their base metal alloys, the high temperature-melting metal being substantially insoluble in the brazing metal at the melting temperature of the brazing metal, an outer portion of brazing metal secured to a face of the intermediate portion, and another portion of brazing metal secured to an opposite face of the intermediate portion, the brazing metal melting at a substantially lower temperature than the high temperature-melting metal.

3. A sandwich composite brazing alloy comprising an intermediate portion including a continuous matrix of brazing metal selected from the group consisting of silver, copper and alloys thereof having distributed therethrough a plurality of laminar particles oriented in generally parallel planes of a high temperature-melting metal of the group consisting of nickel, iron and cobalt and their base metal alloys, the high temperature-melting metal being substantially insoluble in the brazing metal at the melting temperature of the brazing metal, an outer portion of the brazing metal secured to a flat smooth face of the intermediate portion, and another outer portion of the brazing metal secured to a flat smooth face of the intermediate portion opposite the first-mentioned face thereof, the brazing metal melting at a substantially lower temperature than the high temperature-melting metal.

4. The sandwich composite brazing alloy of claim 3 wherein the brazing metal is an alloy consisting essentially of in excess of 50 weight percent of silver together with copper, indium, palladium and lithium.

5. The sandwich composite brazing alloy of claim 3 wherein the brazing metal is an alloy consisting of, by weight, about 84.6 percent silver, 7.5 percent copper, 5.5 percent indium, 2.2 percent palladium and 0.2 percent lithium.

6. The sandwich composite brazing alloy of claim 3 wherein the brazing metal is an alloy consisting essentially of in excess of 50 weight percent silver together with copper and lithium.

7. The sandwich composite brazing alloy of claim 3 wherein the brazing metal is a copper alloy consisting essentially of in excess of 50 weight percent copper.

8. The sandwich composite brazing alloy of claim 3 in strip form.

9. The sandwich composite brazing alloy of claim 3 in sheet form.

(References on following page)

References Cited by the Examiner

UNITED STATES PATENTS

| | | | |
|---|---|---|---|
| 827,378 | 7/06 | Lewis | 29—472.3 |
| 965,788 | 7/10 | Woods | 29—472.3 |
| 1,738,828 | 12/29 | Jackson | 29—199 |
| 2,473,712 | 6/49 | Kinney | 29—199 |
| 2,474,038 | 6/49 | Davignon | 29—199 |
| 2,478,037 | 8/49 | Brennan | 29—199 |
| 2,984,894 | 5/61 | Hill | 29—199 |
| 3,053,610 | 9/62 | Shichman | 29—199 |

DAVID L. RECK, *Primary Examiner.*

HYLAND BIZOT, *Examiner.*